United States Patent
Smith

[19]

[11] Patent Number: 5,934,757
[45] Date of Patent: Aug. 10, 1999

[54] ADJUSTABLE FLEXIBLE SEAT

[76] Inventor: Louis E. Smith, 1226 W. Valley View Dr., Fullerton, Calif. 92833

[21] Appl. No.: 09/089,079

[22] Filed: Jun. 2, 1998

Related U.S. Application Data

[63] Continuation of application No. 08/774,955, Dec. 27, 1996, abandoned.

[51] Int. Cl.$^6$ .................................................... A47C 7/02
[52] U.S. Cl. ............................. 297/452.13; 297/354.12; 297/130; 280/644; 280/642
[58] Field of Search .......................... 297/354.1, 354.12, 297/382, 452.13, 45, 130; 280/644, 642, 650

[56] References Cited

U.S. PATENT DOCUMENTS

| | | | |
|---|---|---|---|
| 4,132,429 | 1/1979 | Woods | 280/647 |
| 4,295,683 | 10/1981 | Dubbink et al. | 297/377 |
| 5,087,066 | 2/1992 | Mong-Hsing | 280/644 |
| 5,490,685 | 2/1996 | Kitayama et al. | 280/47.38 |
| 5,662,380 | 9/1997 | Tam et al. | 297/354.12 |
| 5,669,624 | 9/1997 | Eichhorn | 280/642 |

*Primary Examiner*—Laurie K. Cranmer
*Attorney, Agent, or Firm*—Edward E. Roberts

[57] ABSTRACT

An expandable seat for a stroller, a jogging stroller, or the like, which seat is formed as a unitary or one-piece member with a contoured seating position, a seat back portion and side portions, the latter being configured for, and including provision for, attachment to the frame of the stroller. Excess material in the form of inverted triangular pieces of material are integrally formed with the seat back and a portion of the seating portion, to form pockets of material, with closures or slide fasteners on the long edges thereof being zipped to the closed position to orient the seat back in a generally upright position and, when unzipped, to orient the seat back in a generally reclining position.

18 Claims, 4 Drawing Sheets

ADJUSTABLE FLEXIBLE SEAT

This is a Continuation of application Ser. No. 08/774,955 filed on Dec. 27, 1996 now abandoned.

BACKGROUND OF THE INVENTION

1. Field of the Invention

This invention relates to seats formed of cloth or other flexible cloth-like material, and more particularly to a flexible, adjustable, seat for a child's stroller or the like.

2. Description of the Prior Art

Baby strollers are conventionally configured with a seating area for an infant and three or four wheel assemblies, which are sometimes arranged in pairs of wheels per assembly. In recent times, with physical fitness in mind, strollers have evolved into devices which can be utilized while running or jogging. Such vehicles are referred to as jogging strollers, whereby the parent, or other person, while pushing the infant therein, may conveniently exercise by jogging, or even running. Such joggers are formed of tubular frame members which are generally lightweight and collapsible assemblies.

The seats for such joggers are usually removable and formed of a flexible cloth-like material with snaps or other suitable fasteners placed adjacent the periphery for enabling positioning about a tubular member and snapping the seat in place. The configuration of the material is such that the child or infant is in a seated position within the jogger.

Baby strollers of four (or more) wheel construction typically have provision for adjusting the seat from a sitting position to a reclining position. This is normally accomplished by the seat bottom and seat back being somewhat rigid and interconnected at the sides thereof by oppositely disposed wedge-shaped pieces of flexible material which enables the seat back to assume a position in general alignment with the seat bottom. The seat back is provided with a transversely extending rod member which protrudes beyond the sides thereof to provide stiffening and support adjacent the upper seat back, as well as provide means for enabling affixing of the seat back to side tubes to maintain the seat back in an upright position. In the upright position of the seat back, the back is normally supported by the rod extensions being attached to the side push tubes of the stroller, such as spring-biased hooks or clamps.

In accordance with a feature of the present invention, there is provided a new and improved jogger seat formed as a continuous contoured sheet of a flexible cloth-like material with snaps or other suitable fasteners placed adjacent peripheral portions for enabling positioning about a tubular member and snapping the seat in place, the seat including excess material formed as a pair of pockets at the seat back portion, with the flexible pockets being defined by a suitable closure, such as a pair of slide fasteners or the like, which, when zipped up, orients the seat back in an upright position and, when unzipped, orients the seat back in a generally reclining position.

SUMMARY OF THE INVENTION

The foregoing and other objects of the invention are accomplished by providing an expandable seat for a stroller, a jogging stroller, or the like, which seat is formed as a contoured member with a seating portion, a seat back portion and side portions, the latter being configured for attachment to the frame of the stroller. Excess material in the form of inverted triangular pieces of material are integrally formed with the seat back and a portion of the seating portion with closures or slide fasteners on the long edges thereof being zipped to the closed position to orient the seat back in a generally upright position and, when unzipped, orienting the seat back in a generally reclining position.

Other objects, features and advantages of the invention will become apparent on a reading of the specification when taken in conjunction with the drawings in which like reference numerals refer to like elements in the several views.

DESCRIPTION OF THE PREFERRED EMBODIMENT

Figure 1:
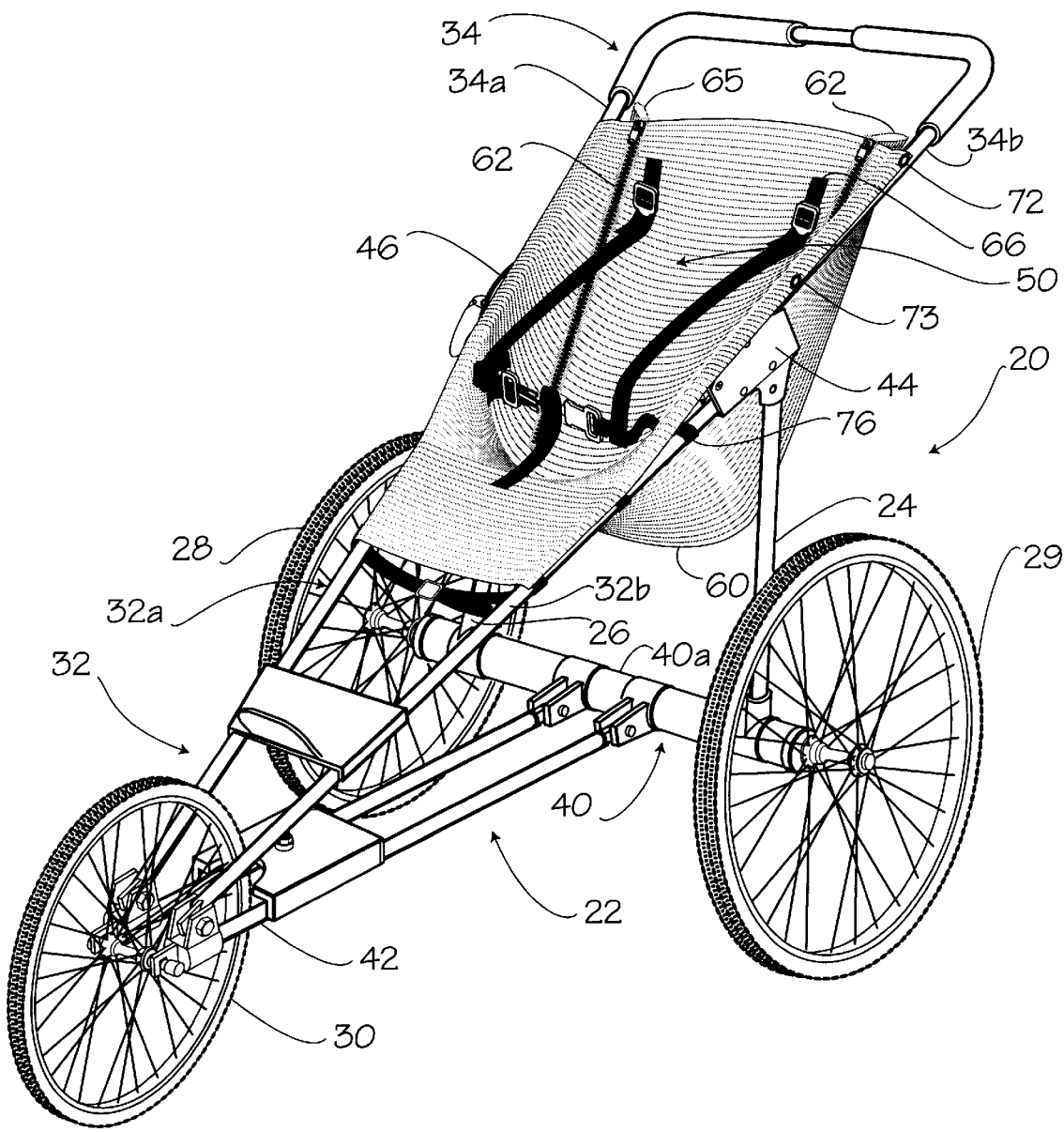
FIG. 1 is a front perspective view of a jogging stroller having attached thereto the adjustable flexible seat according to the invention.
Figure 2:
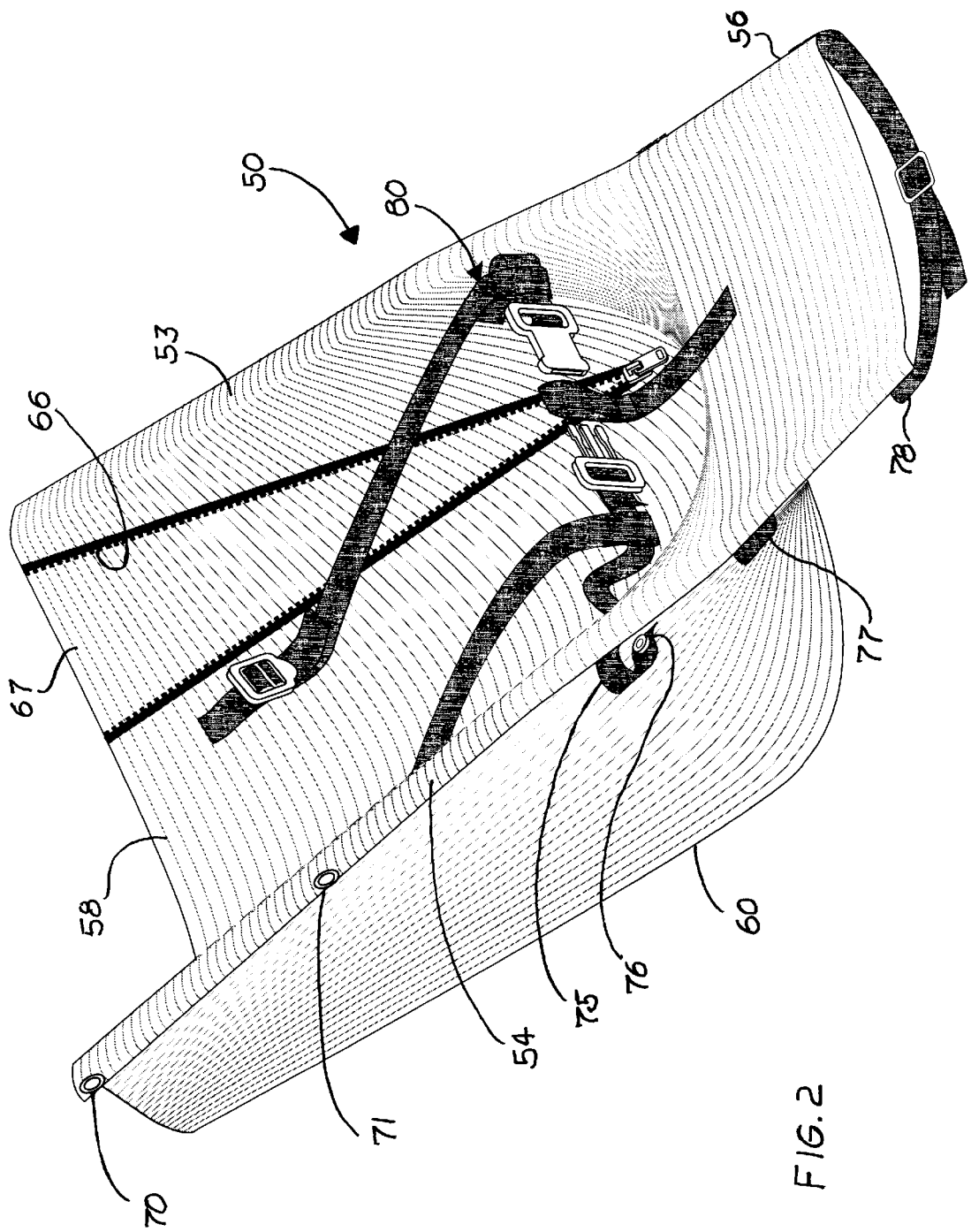
FIG. 2 is a front perspective view of the adjustable flexible seat shown in FIG. 1, with the slide fastener unzipped.

Referring now to the drawings, and particularly to FIGS. 1 and 2, there is shown a three-wheeled jogging stroller, generally designated 20, which includes a wheel support frame assembly, generally designated 22, upright tubes 24, 26, pneumatic tire wheels 28–30, a two part tubular handlebar assembly, generally designated 32, 34, and a flexible cloth-like seat 50.

The wheel support assembly 22 includes a primary structural rear axle assembly 40, and a front wheel 30 fork consisting of first and second generally parallel fork tubes 42. The rear axle assembly has a relatively large diameter (2.5–4.0"") tube 40a, with first and second upright tube members 24, 26, attached at the lower ends to the axle assembly 40 and, at the upper ends to like configured handlebar interconnectors 44, 46. The handlebar interconnectors 44, 46 are generally saddle-shaped and configured for enabling the two components 32, 34 of the handlebar assembly to be folded.

The only requirement for the particular construction of the jogging stroller 20 is that it be constructed to support a seat, generally designated 50, in accordance with the invention. In the embodiment depicted, the handlebar assembly components 32, 34 of the stroller 20, when in the erected ready-for-use position shown in FIG. 1, is constructed so that the coacting handlebar components 32, 34 have opposing push tubes. These push tubes are formed by portions of the two components 32, 34.

On the one side tube portions 32a and 34a together form a structural push tube on the left side (as viewed in the drawing) while tube portions 32b and 34b form a structural push rod on the right side. Due to the particular construction of the stroller 20, there is space between these push tubes for supporting the seat 50, which is so positioned relative to the frame that the center of gravity of an infant seated therein lies virtually directly over the main structural unit, that is, the rear axle assembly 40. Viewed in another way, this center of gravity of an infant in the seat 50 is in general vertical alignment with the axes of the rear wheels 28, 29.

The seat, generally designated 50, is separable from the stroller 20 and is formed as a molded or contoured member formed of flexible natural or man-made cloth-like material, with the contour configured to the anatomy of a seated child or infant. By reference to FIGS. 1 and 2, the seat 50 has first and second laterally opposed side portions 53, 54 adapted for attachment to the structural push tubes (32a, 32b and 34a, 34b). In the jogging stroller shown the push tubes, in plan view converge downwardly, and the side portions 53, 54 of the seat 50 are formed likewise to follow the same angle. The lower portion of the seat 20 is formed to provide a somewhat planar leg rest portion 56, which extends between the opposing push tubes when fastened as will be hereinafter described. The planarity of the leg rest portion 56 is with reference to the seat 50 as attached to the stroller 20. Above the leg rest portion 56 and between the sides 53, 54, the seat 50 is formed as a seat back portion 58 merged with a pouch like seating portion 60, which is contoured to the buttocks portion of a child or infant.

The side portions 53, 54, and leg rest portion 56 include suitable means for releasably attaching the seat 50 to the push tubes. For this purpose, each of the side portions is provided with a pair of spaced female snap fasteners, such as 70, 71 (shown in FIG. 2) and 72, 73 (shown in FIG. 1), one of which is adjacent the top and the other of which is positioned about one-third the way to the leg rest portion 56. Coacting male snap fasteners (not shown) will likewise be attached to the upper ends 34a, 34b of the push tubes.

A short belt and snap fastener 75, 76 is attached to each side 54, 53 adjacent the seating portion 60, the belt and snap fasteners being configured and dimensioned to encircle the push tubes for securing the seat 50. The leg rest portion 56 is provided with a pair of straps 77, 78 with buckles, the straps spanning the distance between opposing push tubes, this configuration enabling adjustment of the planarity of the leg rest portion for comfort of the child or infant rider. A child harness assembly, generally designated 80, is also provided to secure the child within the seat 50. The harness assembly 80 is conventional, including adjustable shoulder straps and a cross-strap with buckle and a detailed explanation is not necessary to the description of the invention.

In accordance with the preferred embodiment of the invention, seat size expansion means are provided. In accordance therewith, the seat back portion 58 and seating portion 60 include seat size expanding or adjusting means which include first and second slide fasteners 64, 66, which are shown in the zipped or closed position in FIGS. 1 and 3, and, in the unzipped or open position in FIGS. 2 and 4. The pockets 65, 67 extend in the same general direction as the side portions 53, 54 and are oriented so that the bottoms, or closed ends of the fasteners 64, 66 are near the juncture of the seat back portion, while the upper ends (in the closed position) are near the juncture of the seat back portion, while the upper ends (in the closed position) are adjacent the push tubes.

In other words, the line of each fastener is somewhat vertical relative to the ground, as a result of which the fasteners (or zippers) will be alongside the occupant rather than in contact with any portion of the body. For this size adjustment, pockets 65, 67 of flexible cloth-like material are formed by use of the slide fasteners 64, 66, respectively. The closed ends of slide fasteners 64, 66 are near the juncture of seat back portion 58 and seating portion 60, with a generally elongate generally inverted triangular piece of material sewed or suitably bonded to the separable hook portions of the slide fasteners 64, 66.

Figure 3:
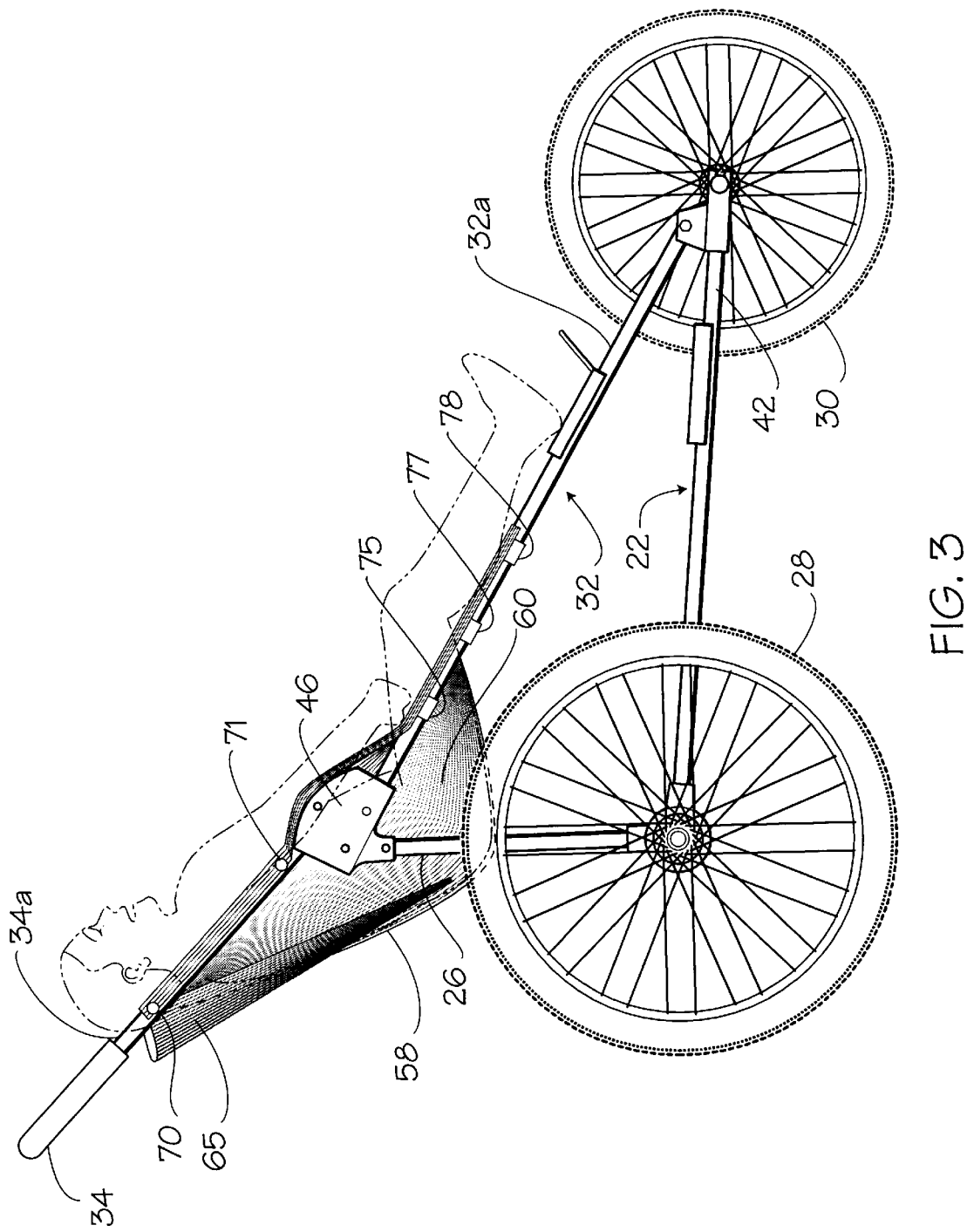
FIG. 3 is a side elevational view of the jogging stroller of FIG. 1 with the seat shown with the seat back in a generally upright position.
Figure 4:
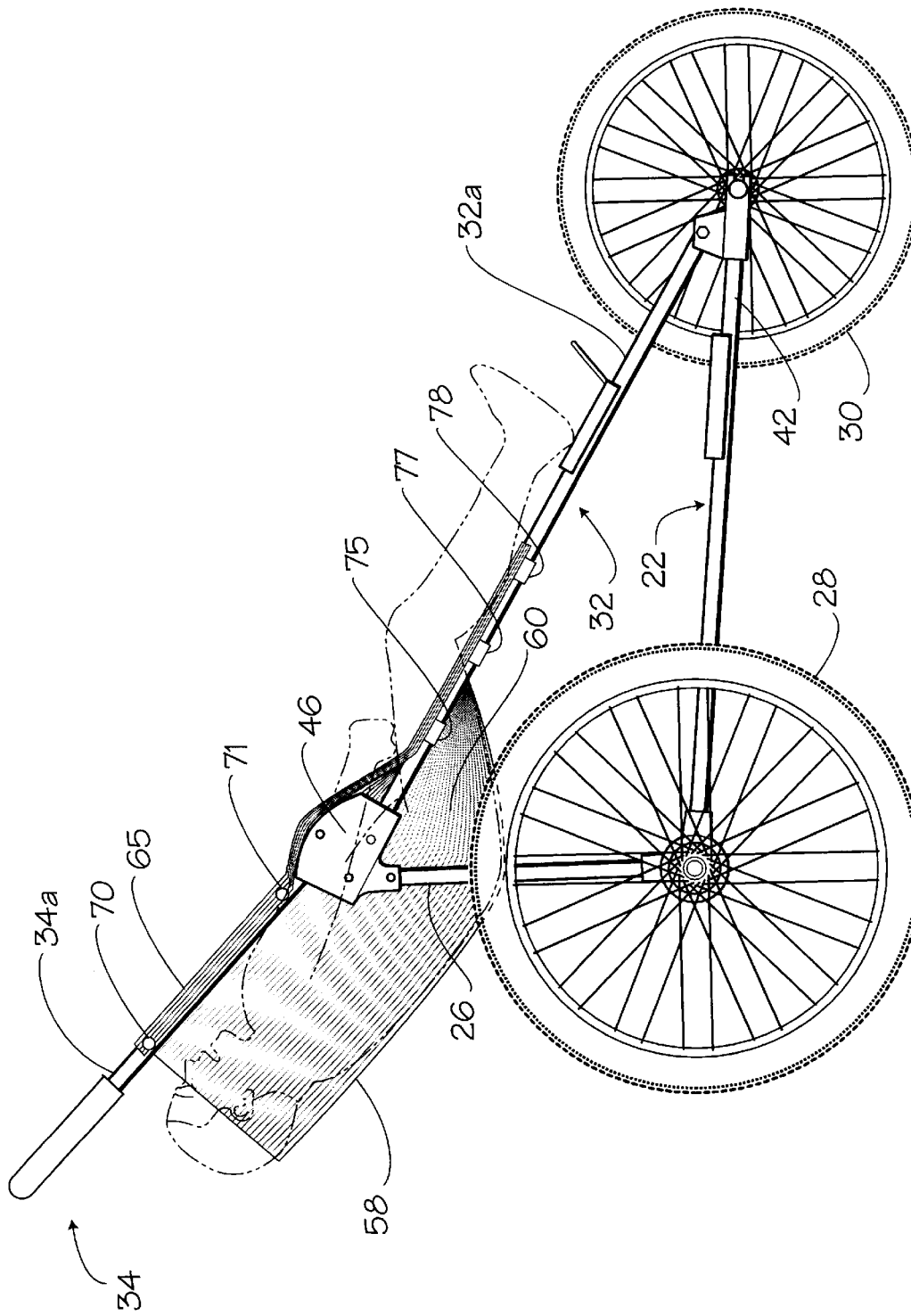
FIG. 4 is a side elevational view of the jogging stroller of FIG. 1 with the seat shown with the seat back in a generally reclining position.

As can be seen in FIG. 3, with the slide fasteners 63, 64, closed or zipped up, the triangular pieces of material appear as pockets, with the child in the set positioned in a generally upright or seating position. With the slide fasteners unzipped to the position shown in FIG. 2, as can be seen in FIG. 4, the child occupant is in a generally reclining position within the seat 50 due to the size adjustment or enlargement of the seating surface area.

In both the seated position and the reclining position, the seat back is supported only by its attachment to the balance of the seat, that is, no external rods, tubes or clamps are required for providing for the expansion or contraction of the seat contour. The seat 50 is formed of a suitable material for supporting the child or toddler therein and is constructed as a unitary seat, that is, the cloth material parts are not separable, thus fully surrounding the back and sides of the occupant, whether in the seated or reclining position.

While the preferred embodiment has described the use of slide fasteners to effect the adjustment, it is to be understood that other suitable means may be employed, such as snap fasteners or "Velcro" hook-and-eye fasteners, if desired. Similarly, the attachment means to secure the seat 50 to the jogging stroller 50 may utilize other fastening means such as hook-and-eye fasteners or the like.

In accordance with the present invention there has been shown and described a seat for a stroller or the like which may be adjusted between a sitting position and a reclining position, with the set formed of generally flexible cloth or cloth-like material and which is of economical compact construction. Although there has been shown and described a preferred embodiment, it is to be understood that other modifications may be made within the spirit and scope of the invention.

What is claimed is:

1. A flexible cloth-like seat for attachment to a pair of downwardly convergent push tubes of a frame of a jogging stroller having a pair of rear wheels supported by a common axle and a front wheel affixed for rotation at lower ends of said push tubes, said seat comprising:

opposing side portions;

means coacting with said side portions for enabling attachment of said seat to the frame of the stroller to span said opposing side portions in free suspension therefrom;

a leg rest portion having means for connection to and spanning the distance between said push tubes adjacent the lower portion of said seat;

a seating portion between said side portions above said leg rest portion, said seating portion being generally contoured to the buttocks of the occupant and arranged for the buttocks of the occupant to be positioned substantially vertically above said axle;

a seat back portion between said side portions and merging with said seating portion;

closure means attached to at least said back portion; and pocket means of flexible cloth-like material attached to said closure means for enabling orienting of the seat back portion in a generally upright position when closed and, in a generally reclining position when opened.

2. The seat of claim 1 wherein said seating portion is positioned relative to said frame such that the center of gravity of the buttocks of an occupant seated therein is in substantially vertical alignment with said axle of said rear wheels in both the upright and reclining position.

3. The seat of claim 1 wherein there are first and second closure means spaced apart from one another and in general alignment with, and proximate to said side portions.

4. The seat of claim 3 wherein said seat is of unitary one piece material, each of said closure means is a slide fastener, and said seat further includes a shoulder harness and seat belt assembly and means for releasably attaching said seat to said push tubes.

5. A flexible cloth-like seat for attachment to a pair of downwardly convergent push tubes of a frame of a jogging stroller having a pair of rear wheels supported by a common axle and a front wheel affixed for rotation at lower ends of said push tubes, said seat comprising:

opposing side portions;

means coacting with said side portions for enabling attachment of said seat to the frame of the stroller to span said push tubes in free suspension therefrom;

a seating portion between said side portions, said seating portion being arranged and positioned relative to said frame such that the center of gravity of an occupant seated therein is in substantially vertical alignment with said axle of said rear wheels;

a seat back portion between said side portions and merging with said seating portion;

first and second slide fasteners attached to at least said seat back portion;

pocket means attached to said each of said slide fasteners for enabling orienting of the seat back portion in a generally upright position with said slide fasteners closed and, in a generally reclining position with said slide fasteners opened; and wherein said seating portion is arranged and positioned such that the center of gravity of an occupant seated therein is in substantially vertical alignment with said axle of said rear wheels in both the upright and reclining position.

6. The seat of claim 5 wherein said pocket means are formed of flexible cloth-like material of inverted triangular configuration.

7. The seat of claim 5 wherein said slide fasteners have the closed end thereof in proximate relation to the juncture of said seating portion and said seat back portion.

8. The seat of claim 7 wherein said slide fasteners are oriented in a direction in general alignment with said side portions and said slide fasteners are positioned in the closed position such that the line of each is generally alongside the back of the occupant.

9. The seat of claim 8 further comprising a shoulder harness and seat belt assembly and means for releasably attaching said seat to said push tubes, and wherein said seating portion is generally contoured to the buttocks of the occupant.

10. The seat of claim 5 wherein said seat is of unitary one piece material.

11. The seat of claim 10 further comprising a generally planar leg rest portion having means for connection to and spanning the distance between said push tubes adjacent the lower portion of said seat.

12. A flexible cloth-like seat for attachment to a pair of downwardly convergent push tubes of a frame of a jogging stroller having a pair of rear wheels supported by a common axle and a front wheel affixed for rotation at lower ends of said push tubes, said seat comprising:

opposing side portions;

means coacting with said side portions for enabling attachment of said seat to the frame of the stroller to span said side portions in free suspension therefrom;

a seating portion between said side portions arranged for being positioned relative to said frame such that the center of gravity of said occupant is in substantially vertical alignment with said axle of said rear wheels; and a seat back portion between said side portions and merging with said seating portion.

13. The seat of claim 12 wherein said seating portion further includes pocket means having slide fasteners therein for enabling orienting of the seat back portion in a generally upright position with said slide fasteners closed and, in a generally reclining position with said slide fasteners opened; and wherein said seating portion is arranged and positioned such that the center of gravity of an occupant seated therein is in substantially vertical alignment with said axle of said rear wheels in both the upright and reclining position.

14. The seat of claim 13 further including first and second slide fasteners attached to at least said seat back portion and having a closed end in proximate relation to the juncture of said seating portion and said seat back portion.

15. The seat of claim 14 further including pocket means of inverted triangular configuration attached to said each of said slide fasteners for enabling orienting of the seat back portion in a generally upright position with said slide fasteners closed and, in a generally reclining position with said slide fasteners opened.

16. The seat of claim 15 further including a generally planar leg rest portion merging with said seating portion adjacent the lower edge thereof and having means for connection to and spanning the distance between said push tubes.

17. The seat of claim 15 further including a shoulder harness and seat belt assembly.

18. The seat of claim 15 wherein said seat is of unitary one piece material contoured to the anatomy of a seated child.

* * * * *